United States Patent [19]
Scatoloni

[11] 3,925,638
[45] Dec. 9, 1975

[54] ELECTRODE CLEANING MEANS IN AN ELECTRIC WATER HEATER

[76] Inventor: Guido J. Scatoloni, 1942 Gladwick St., Compton, Calif. 90220

[22] Filed: June 20, 1973

[21] Appl. No.: 371,740

[52] U.S. Cl. .................. 219/295; 204/149; 204/228
[51] Int. Cl.² ........................................ H05B 3/60
[58] Field of Search ......... 219/295; 204/129.1, 149, 204/228

[56] References Cited
UNITED STATES PATENTS

| | | | |
|---|---|---|---|
| 3,198,724 | 8/1965 | Cross et al. | 204/228 X |
| 3,637,482 | 1/1972 | Vajda | 204/149 X |
| 3,785,954 | 1/1974 | Herbert | 204/149 X |

*Primary Examiner*—G. Harris
*Attorney, Agent, or Firm*—Edgar W. Averill, Jr.

[57] ABSTRACT

A flow through electric water heater of the type having carbon containing electrodes is disclosed herein. The heater has means for reducing the deposition of scale on the electrode surfaces. Water heaters of the type disclosed herein are normally operated on 110 or 220 volt alternating current maintained across the electrodes and a current passes through the water between the electrodes. Reduced deposition is brought about by the application of a direct current potential across the electrodes or by the use of an improved graphitic electrode containing metal particles or by both of these means in combination.

11 Claims, 4 Drawing Figures

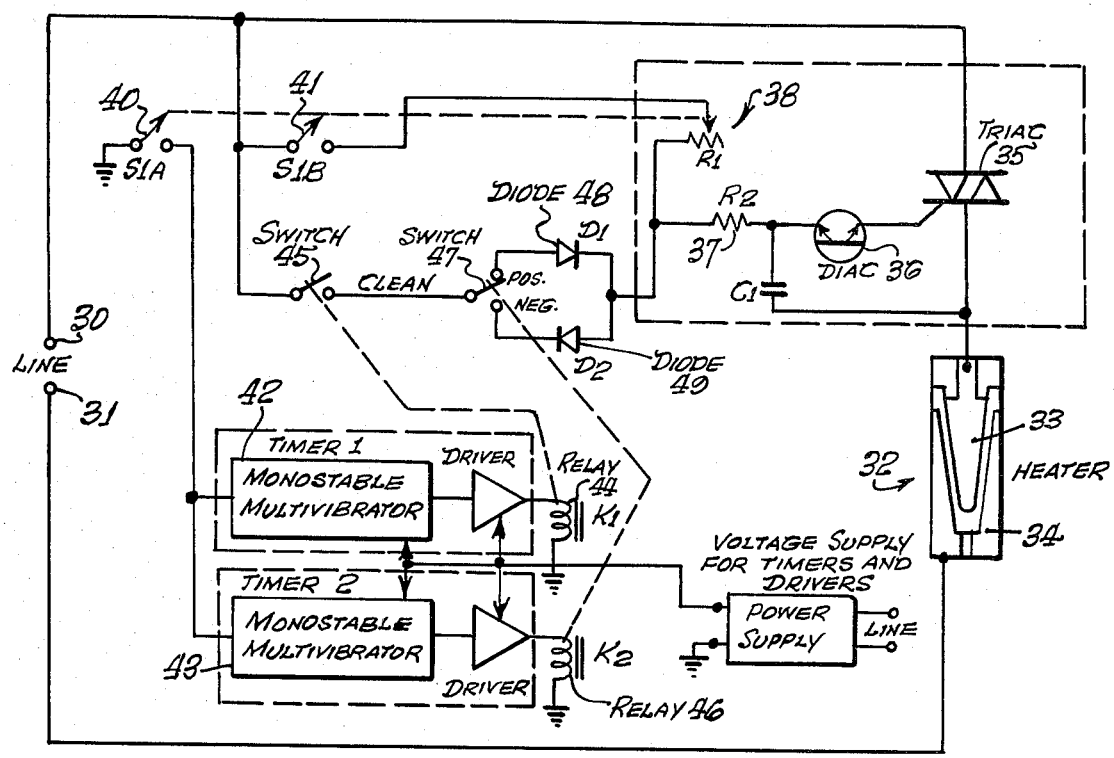
FIG. 2.
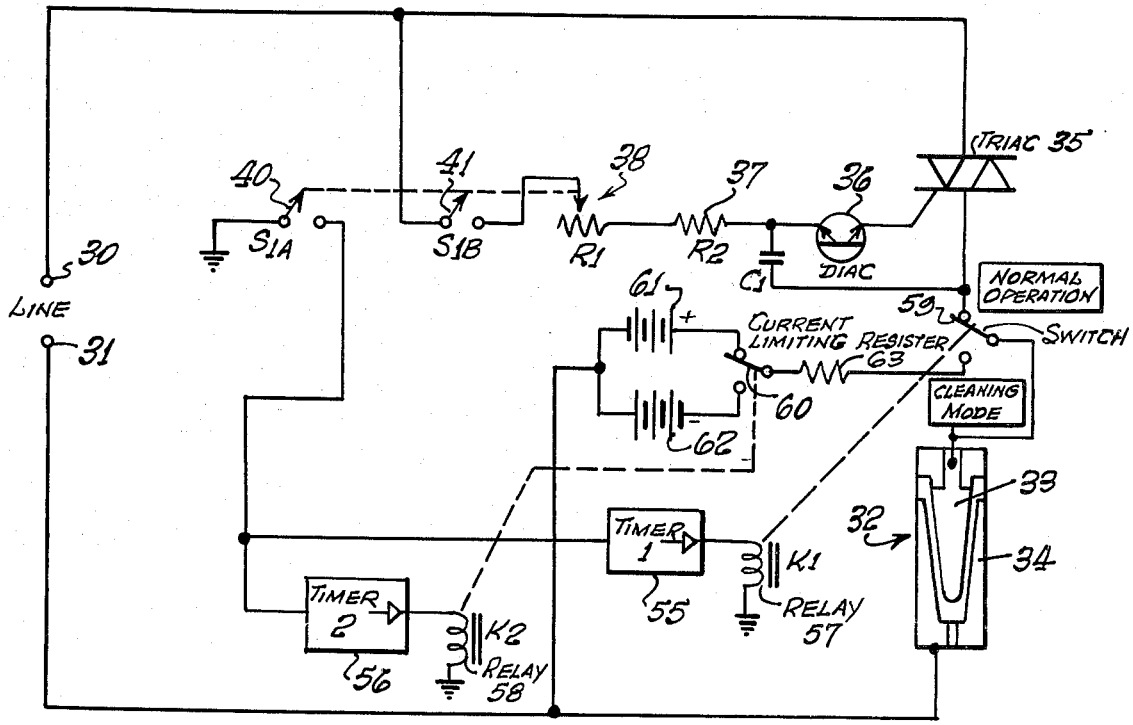
FIG. 3. LOW POWERED CLEANER

ELECTRODE CLEANING MEANS IN AN ELECTRIC WATER HEATER

BACKGROUND OF THE INVENTION

The field of the invention is hot water heaters and more particularly related to electric hot water heaters which are typically operated on 110 or 220 volt alternating current. Such heaters may be used for domestic residential water heating or for such applications as water heating in vending machines, recreational vehicles or industrial applications.

Electric water heaters are well known and may be of two general types. The most commonly used electric water heaters utilize electric resisting heating typically provided by a coiled heating element which is placed in a heat conducting relationship with a water reservoir.

Another type of electric heater utilizes the conductivity of the water as a resistance element and is capable of heating water by applying an electrical potential between two electrodes which are immersed in water. Although water heaters of this type have been known for many years (see, for instance, Hill U.S. Pat. No. 678,782, issued July 16, 1901), they have not found wide acceptance largely because their efficiency and their ability to heat water decreases with time. This decrease is brought about by several factors. One is the deposition of an insulative scale or deposit on the electrode surfaces which decreases current flow through the water at any given potential. Another reason for decreased efficiency with time is the erosion of the electrodes caused by oxidation, corrosion, or a physical erosion. Whatever the cause, the effect of this erosion is a widening of the gap between adjacent electrodes, and thus, an increase in resistance between them.

Numerous materials of construction have been used to fabricate electrodes in hopes of decreasing scaling or reducing erosion. Noble metals such as platinum and gold have been tried but scaling nonetheless results. The most satisfactory material and that most commonly used is carbon which is preferably in the form of graphite. The problems of deposit formation and surface erosion or etching are particularly acute when a relatively high voltage such as 110 volts is utilized. In order to provide sufficient heating capacity relatively high voltages are dictated and it is this dilemma which has prevented water heaters of this type from widespread acceptance. Furthermore, many graphites are relatively soft and are physically eroded in the water to a significant degree.

To distinguish the electric resistance water heater which heats by conducting heat generated in a resistance element from the type of water heater which heats by conducting electricity through the water itself, the latter type of heaters will be referred to herein as "water conduction heaters."

SUMMARY OF THE INVENTION

It is thus an object of the present invention to provide an improved water conduction heater.

It is another object of the present invention to provide a water conduction heater with means for removing surface deposits.

It is yet another object of the present invention to provide a water conduction heater with carbon-containing electrodes having decreased electrode erosion.

The present invention is for a water conduction heater having carbon-containing electrodes and provided with electrical means for the application of a periodic and intermittent direct current potential sufficient to remove scale at the cathode electrode. The present invention also is for an improved graphitic electrode material impregnated with finely divided metal. Preferred metals include copper, copper alloys, lead and alloys of lead. The use of these metals with a high density graphite is particularly effective.

BRIEF DESCRIPTION OF THE DRAWINGS

FIG. 2 is a circuit diagram useful for direct current cleaning of carbon-containing electrodes.

FIG. 3 is an alternate circuit diagram for the direct current cleaning of carbon-containing electrodes.

DESCRIPTION OF THE PREFERRED EMBODIMENTS

Figure 1:
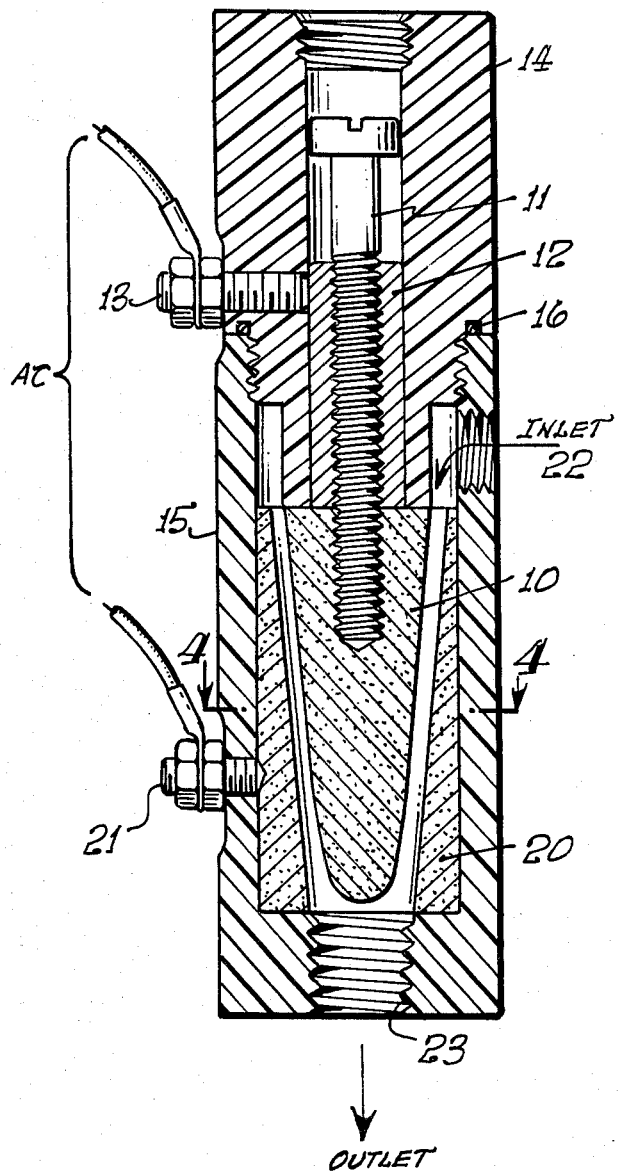
FIG. 1 is a cross sectional side elevation of the heater of the present invention.

A particularly simple water conduction heater is shown in FIG. 1. A frusto-conical graphite electrode 10 is threaded onto a brass screw 11. Screw 11 is held by a threaded brass collar 12 which, in turn, is contacted by a threaded brass pin 13 which serves both as an electrical contact and a physical holding pin for collar 12. The body of the heater has an upper part 14 which is threaded to a lower part 15 and the two parts are made water tight by a gasket 16.

The outer electrode 20 is also made of graphite and is cylindrical on its outer surface and has a frusto-conically shaped inner surface. Outer electrode 20 is contacted by brass pin 21 which provides both an electrical and a physical contact for the outer electrode. Pin 21 is threaded through the lower part of the body 15.

Water inlet 22 is located in the side of body 15 and outlet 23 is located at the bottom of body 15 and the inlet and outlet may be provided with conventional threads or other means for attachment to water piping.

In operation, an electrical potential such as 110 volts alternating current is applied across pins 13 and 21 and thus across electrodes 10 and 20. Water is permitted to pass through from inlet 22 to outlet 23 and thus provides a conductive path between electrodes 10 and 20. It is, of course, necessary that electrodes 10 and 20 be insulated from one another so that the electrical current will flow through the water to be heated. This is most readily done by fabricating the upper and lower body parts from an insulative material such as plastic. It is, of course, further necessary that the plastic be capable of withstanding relatively high temperatures, but such plastics are well known to those skilled in the art. Alternatively, the upper and lower body parts could be fabricated from a metal such as brass and insulated from one another by means such as an insulative collar. This would, of course, further require outer insulation means as a safety precaution in the event that the heater was placed in an environment where it might be touched.

A preferred electrical circuit for carrying out the present invention is shown in FIG. 2 in schematic form. Line voltage is impressed across points 30 and 31. This voltage could be either 110 or 220 volt alternating current, but, for purposes of the present diagram will be considered 110 volts, 60 cycle alternating current. The heater indicated generally by reference character 32 has a center electrode 33 and an outer or sleeve electrode 34. A triac 35 regulates the amount of power supplied to the heater depending upon the voltage impressed upon it through diac 36 having resistor 37 connected in series therewith. Resistor 37 is typically 15,000 ohms for 110 volts and 33,000 ohms for 220 volts. Potentiometer 38, typically 250,000 ohms for 110 volts and 500,000 ohms for 220 volts, controls the conduction angle and thus the power which is impressed across the heater electrodes 33 and 34. Heater switches 40 and 41, which are mechanically connected, are closed to initiate operation and potentiometer 38 is adjusted to provide a current flow of 20 amps. Of course, the current flow depends upon the geometry and size of the electrodes and 20 amps is a typical figure for electrodes having a surface area of about 9.4 square inches.

The cleaning cycle is activated when switches 40 and 41 are opened which starts timers 42 and 43. These timers are monostable multivibrators and timer 42 is activated for 3 seconds, whereas timer 43 is activated for 1.5 seconds. Of course, the length of time of the cleaning cycle may be varied depending upon the voltage used and the desired duration of the cleaning cycle. Preferred times are discussed below. When timer 42 starts, relay 44 is energized moving the associated contact arm of switch 45 to a closed position. At the same time, timer 43 activates relay 46 placing switch 47 in a negative position. This causes the alternating current to be partially rectified by diode 49 causing a series of positive pulses to flow through the load. Timer 43 times out in 1.5 seconds releasing the arm of switch 47 to the positive position and a series of negative pulses flow through diode 48 cleaning the second electrode.

THEORY OF OPERATION

Water conduction heaters of the type described above require excellent electrical conductivity between electrodes and the water. Any insulating deposits upon the electrode surfaces decrease current flow and thus decreases the power which can be put into the water thereby reducing its temperature increase at any given flow rate. It has been discovered that by generating oxygen on the positive electrode (anode) the graphite or carbon surface can be slightly etched or oxidized producing carbon dioxide. This etching of the surface destroys the adhesion of any deposit which has formed at the interface between the electrode and the water. Thus, by anodic polarization of each electrode periodically, the electrode surfaces are kept free of undesirable insulating deposits.

While it had been known that normal 60-cycle alternating current did not create this cleaning effect, surprisingly it has been discovered that the above-described chemical etching can be carried out in a very short period of time even as low as 1/10 of a second. It has been found that with 110 volt half wave current that the polarization should be carried out for at least ½ second with 1½ seconds being a preferred duration for 110 volt half wave current. Of course, if the voltage is reduced for the cleaning cycle, longer cleaning duration is required.

Cleaning duration, however, should be kept to a minimum consistent with surface scale removal. Since the process is actually one of electrolytically milling of the electrode surfaces, this milling gradually etches the surface thereby increasing the gap width which, in turn, decreases current flow. Thus, by keeping the cleaning cycle to a minimum the life of the heater is prolonged.

LOW POWERED CLEANING

Turning now to FIG. 3, when switches 40 and 41 are closed, line voltage is impressed across electrodes 33 and 34. When the switches are open, monostable multivibrators 55 and 56 are started. When the cleaning cycle is carried out with a 12 volt battery timer 55 should preferably activate relay 57 for 10 seconds and timer 56 should activate relay 58 for about 5 seconds. Relay 57 activates switch 59 to its cleaning mode. Relay 58 activates switch 60 which reverses the polarity of voltage impressed on the heater 32 half way through the cleaning cycle. Thus, in operation, the heater 32 has each of its electrodes cleaned for about 5 seconds.

VARIATIONS ON INSERTION OF CLEANING CYCLES

Although the above circuits indicate a cleaning cycle at the end of each heating operation, it is possible to insert the cleaning cycle in a different manner. For instance, the cleaning could be inserted at the beginning of each operation, or after an accumulation of a predetermined time. Furthermore, some circuit simplification can be obtained by cleaning only one electrode with each heating operation. Still further, the cleaning step could be activated by a thermal switch which would be proportional to the amount of scaling since the scaling has the effect of decreasing temperature rise. Such variations are carried out with simple modifications of the circuits shown and a more detailed circuit description is believed unnecessary for an understanding of the present invention.

MATERIAL SELECTION

It has been discovered that the tenacity with which scale adheres to the electrode surface is quite dependent upon the selection of electrode material. Furthermore, the rate at which the electrode is electrically etched by the cleaning step is also material dependent. It has been found that graphite, particularly high density graphite, gives substantially longer life than carbon as an electrode material. It has, furthermore, been discovered that some metal impregnated graphites particularly those impregnated with copper or lead are particularly effective. These metal impregnated graphites have vastly improved life even when no cleaning cycle whatsoever is impressed across the electrodes. With the proper selection of cleaning cycle metal impregnation has a far less significant effect.

Figure 4:
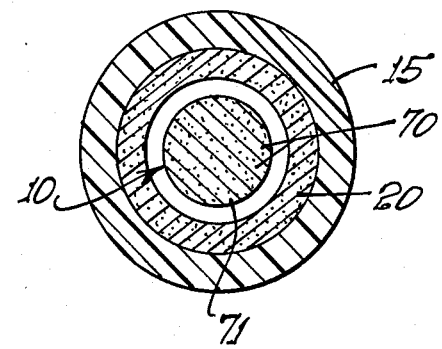
FIG. 4 is a cross sectional view taken along line 4—4 of FIG. 1.

FIG. 4 is a cross-sectional view of the electrode 10 shown in FIG. 1. The electrode is generally fabricated from a high density graphite such as that sold under the trade name "POCO (AXF, AXF-5Q, AXZ, AXZ-5Z, ACF-10Q)."

These graphites are heated to from 2500° to 2800° centigrade and have between 15 percent and 20 percent porosity. Approximately one half of this porosity is filled with metal which is deposited therein utilizing high vacuum and high temperatures to vaporize and deposit the metals in the pores. Such graphites are commercially available under the trade name POCO (AXF-Cu, AXF-5Q Cu, AXZ-Cu, AXZ-5Q Cu, AXF-brass).

While not wishing to be bound by an theory, it is believed that the metalized graphite exhibit a lower tendency to scale because of decreased porosity in their surface. It is believed that the scale adheres more tenaciously to untreated graphite or to carbon by a physical attachment to a more porous surface. It is not believed that the metal is effective because of any increase in conductivity since it has been found that other conductive metals such as silver are not as effective. Other impregnating metals which were found to be ineffective include nickel and chromium, while intermediate ineffectiveness was found by impregnation with cadmium, antimony and tin. Lead alloys such as babbit create an adhering film that does not flake off as easily but the film appears to be more conductive than the film observed with metals such as nickel and chrome as the impregnating material.

It is also believed that reduced porosity resulting from metal impregnation reduces water penetration into the electrodes which in turn is believed to physically erode small particles from the surface when the water expanded by heating.

RESULTS

Graph 1 below compares the conductivity of a water conduction heater with and without DC cleaning. The test unit utilized two high density graphite electrodes machined from the conventional graphite sold under the trade name "Electro-nite E-213." The geometry of the unit was similar to that shown in Graph 1. The initial current for each unit was 17 amps and after only 4 hours the current flow without DC cleaning had dropped to 10 amps, whereas no measurable decrease in current was noted utilizing DC cleaning inserted at a rate of 20 seconds of DC per hour of use. The term "DC" or "direct current" as used in this application comprehends the rectified one half sign wave described above.

The current in the unit without DC cleaning had dropped to 4 amps after 15 hours of use, whereas the unit with DC cleaning continued with no measurable drop after 15 hours. The current of the uncleaned unit dropped to 3 amps at which time the test on this unit was discontinued. No measurable drop in current had been noted on the unit with DC cleaning. After about 110 hours the unit with DC cleaning still exhibits the current flow of about 14½ amps.

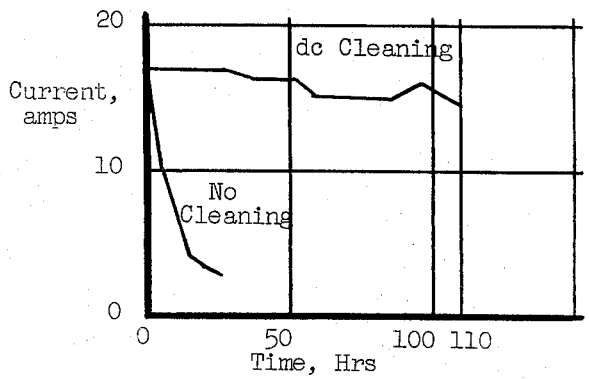

Graph 1

The following comparison was run with high density graphite and once again DC cleaning had a dramatic effect on current flow. Initial flow in this 3.4 square inch test unit having a geometry similar to that shown in Graph 1 of the drawing was 20 amps. After 10 hours the unit without DC cleaning had dropped to 7.5 amps, whereas the unit with DC cleaning at a rate of 20 seconds of DC current per hour of use exhibited 19 amps flow. After 24 hours, the current flow without DC cleaning had dropped to 3½ amps, whereas it was 18 amps with DC cleaning. After 134 hours, the current flow was about 15½ amps with DC cleaning. The results are shown in Graph 2 below:

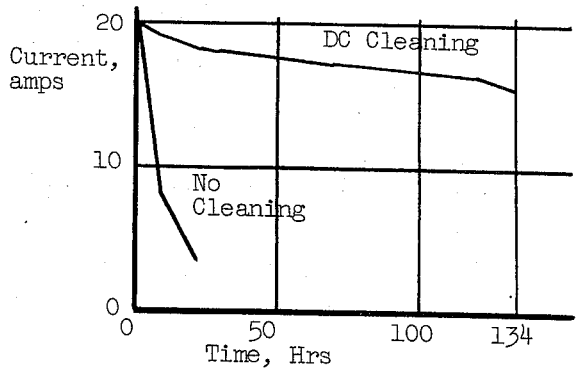

Graph 2

The effect of metal impregnation is shown in Graph 3 below where copper impregnated high density graphite was compared with untreated high density graphite in a test unit having a surface area of 9.4 square inches and fabricated with a geometry similar to that shown in Graph 1. No DC cleaning was used. Initial current flow for both units was 17 amps but after 30 hours the current flow of the untreated high density graphite had dropped to 6.4 amps, whereas after the same time the current flow in the impregnated graphite was about 17.3 amps. After 72 hours current flow with the untreated graphite had dropped to 3 amps, whereas the treated graphite still exhibited a current flow of almost 13 amps. Even after 300 hours the current flow in the copper impregnated graphite was 12 amps. It has been found that current flow in the copper impregnated units is quite dependent upon the water flow rate. It is believed that turbulent flow helps to physically remove the surface scale and thus is particularly helpful to the metal impregnated graphites.

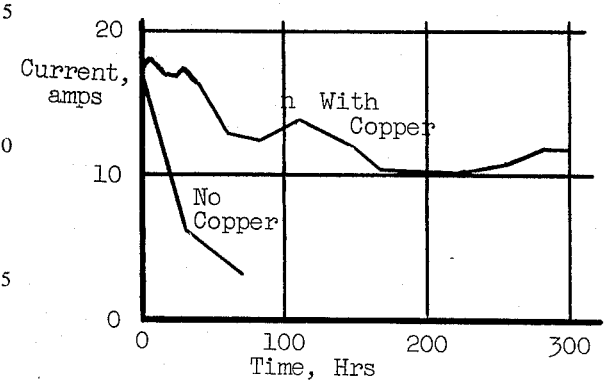

Graph 3

A small (3.4 square inch) test unit was used to compare the copper impregnated high density graphite with untreated high density graphite and the results are shown in Graph 4 below.

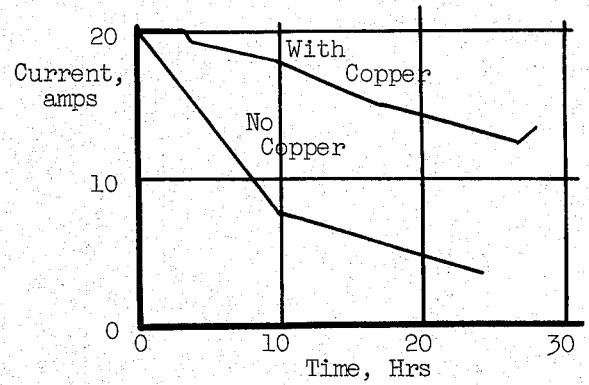

Graph 4

DC cleaning although shown to be a particularly useful means for increasing current flow rate and thus power input does have the effect of increasing gap width and even with complete surface cleaning some decreased current flow will result. Graph 5 below shows the time required before a 20 percent gap increase occurs at different DC current densities. With a relatively large initial gap size the time for a 20 percent increase in gap is greater. Curves are shown with gaps of ¼ inch and 1/16 inch:

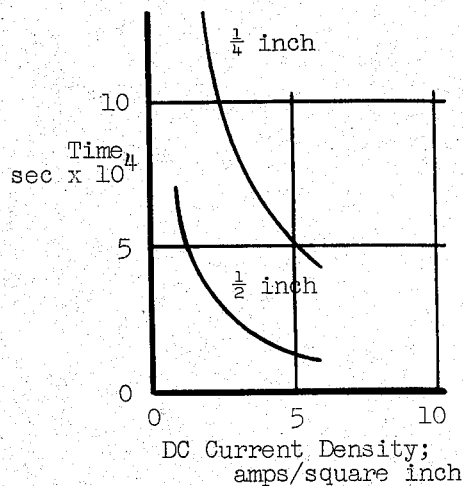

Graph 5

A heater having an inner electrode heating surface area of 7.87 square inches was made using the conventional graphite sold under the trademark "Electro-nite E-213." A DC cleaning cycle was inserted using half wave 110 volt current at 5 second intervals after each 14 minutes of operation. Colorado River water was heated from 60°F. to 90°F. at a flow rate of one half gallon per hour. Initial current flow was 21 amps which decreased to 20 amps after about 300 hours of heating time and to about 19 amps after about 410 hours. Current flow was 18.5 amps at 480 hours of continuous heating time. The heater was operated for 14 minutes after which it was shut off for 1 minute. All of the above tests were carried out in a relatively hard water (Colorado river water). Of course, significantly longer life would be observed with softer and less scale forming waters. The process of the present invention would nonetheless be useful and electrode life would be still longer than those shown on the relatively severe test conditions used herein.

While the present invention requires electrodes with a surface which is made with a substantial amount of carbon, it is not essential that the electrodes be solid or homogeneous from the surface to the back. For instance, the inner electrode as shown in Graph 1 of the drawings could have a conductive inner core of copper, brass or other conductive metal.

The term "alternating current" as used herein includes not only the 60-cycle alternating current commonly used in the United States but also frequencies as 25 cycles which are commercially used. Furthermore, the present invention may be used with alternating current frequencies outside of this range as the frequency is not critical as long as it is greater than about 15 seconds. Frequencies below this level begin to have an electrode etching effect and serve to decrease electrode life.

The metal impregnated graphites of the present invention should contain between 5 and 15 percent by volume of the metal and preferably between 7 and 10 percent. When the term copper or lead alloy is used, it is intended to indicate that the alloy has at least 50 percent of the indicated metal.

The present embodiments of this invention are thus to be considered in all respects as illustrative and not restrictive, the scope of the invention being indicated by the appendant claims rather than by the foregoing description. All changes which come within the meaning and range of equivolency of the claims therefore are intended to be embraced therein.

I claim:

1. A flow through electric water heater of the type having a plurality of carbon-containing electrodes held in a spaced apart relationship within the body of said heater and having means for supplying an alternating current potential between adjacent electrodes wherein the improvement comprises:

electrode cleaning means comprising at least two electrodes, each of said electrodes containing a substantial amount of carbon, an electrical circuit adapted to supply a direct current potential of between 6 and 220 volts between adjacent electrodes for an intermittant time interval sufficient to clean said electrode, said electric circuit further being adapted to provide each electrode in said heater with a positive charge with respect to an adjacent electrode whereby deposits are removed from the surface of an electrode during the time at which a positive charge is applied thereto.

2. The heater of claim 1 wherein said alternating current potential is about 110 volt 60 cycle potential.

3. The heater of claim 1 wherein said alternating current potential is about 220 volt 60 cycle potential.

4. The heater of claim 2 wherein said direct current potential is one half wave rectified alternating current.

5. The heater of claim 4 wherein said direct current potential is applied to each electrode for a period of from one half to ten seconds.

6. The heater of claim 5 wherein said direct current potential is applied between 1½ and 5 second intervals.

7. The heater of claim 1 wherein said direct current potential is supplied from a storage battery.

8. The heater of claim 7 wherein said battery is a 12-volt battery and the duration of said direct current potential is between one and ten seconds.

9. The heater of claim 8 wherein the duration of said direct current potential is about 5 seconds.

10. The heater of claim 1 wherein said direct current potential is started as said heater is turned off.

11. The heater of claim 1 wherein said direct current potential is applied when the current flow through said heater decreases to a predetermined value.

* * * * *